June 3, 1930.  J. C. GIPE  1,761,721
VALVE
Filed Sept. 1, 1926
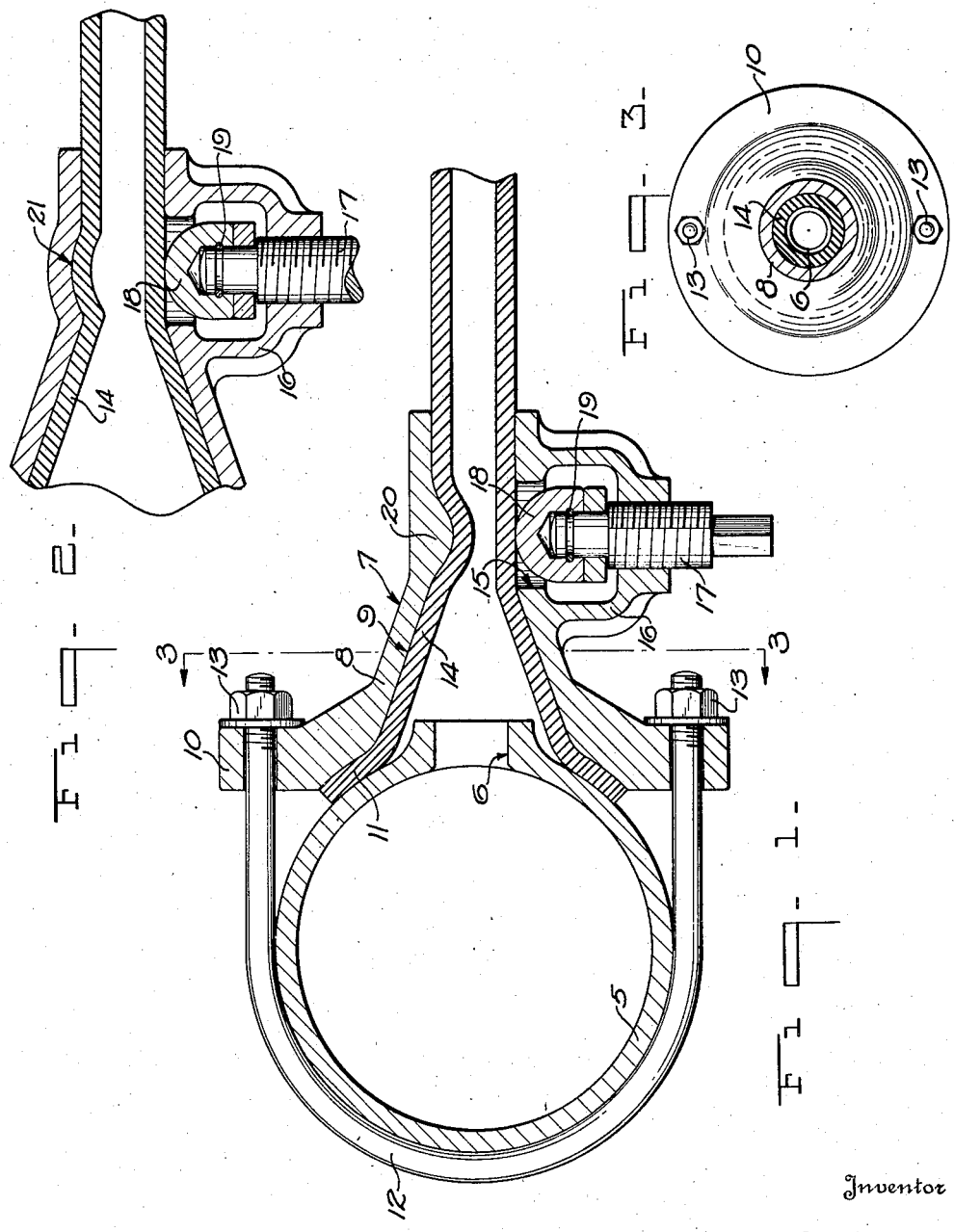
Inventor
John C. Gipe.
By Frank Fraser,
Attorney Patented June 3, 1930

1,761,721

UNITED STATES PATENT OFFICE

JOHN C. GIPE, OF TOLEDO, OHIO, ASSIGNOR TO LIBBEY-OWENS GLASS COMPANY, OF TOLEDO, OHIO, A CORPORATION OF OHIO

VALVE

Application filed September 1, 1926. Serial No. 133,026.

The present invention relates to new and useful improvements in valves, and has more specific reference to a novel and simplified valve primarily constructed for use in systems employing various forms of abrasive.

In the grinding of plate glass various abrasives such as sand, garnet, carborundum, etc., are maintained in suspension in water, and are continuously circulated through a pipe at a relatively high speed, being tapped off at frequent intervals for use. This continuous circulation of the abrasive creates a severe cutting action on the parts of the system containing the same.

Ordinary types of valves have not been found entirely satisfactory in these systems as the abrasives wear away parts thereof so that in a comparatively short time the valve leaks and it is necessary to replace the same. Thus the action of the abrasives upon the valve parts is very detrimental and renders the life of the valve very short necessitating frequent repairs and replacements. Although the particular valve provided by the present invention is primarily designed for use in such systems referred to above, it is in no way restricted to such use as it can be used wherever ordinary valves are now employed.

It is the primary object of the present invention to provide a valve which will efficiently withstand the wear of an abrasive passing therethrough.

Another object of the invention is to provide a valve including a housing, and a compressible member contained within the housing which is adapted to be compressed to control the effective opening thereof.

Another object of the invention is to provide such an improved valve of the above character having a compressible liner which can be readily removed and replaced when it has become worn.

Other objects and advantages of the invention will become more readily apparent during the course of the following description when taken in connection with the accompanying drawings.

In the drawings forming a part of this application,

Fig. 1 is a longitudinal section through a valve constructed in accordance with the present invention showing the same secured in position, Fig. 2 is a longitudinal section through a somewhat modified type of valve, and Fig. 3 is a sectional view taken on line 3—3 of Fig. 1.

Referring now more in detail to the drawings, the numeral 5 designates one pipe of a system adapted to contain a flow of abrasive, said pipe being provided with a lateral outlet opening 6.

The valve provided by the present invention is designated in its entirety by the numeral 7, and comprises a casing or housing 8 provided with a central bore 9, the inner end thereof being substantially cone-shaped, and adapted to aline with the opening 6 in the pipe 5 when the valve is secured in position.

The inner end of the housing is provided with an annular flange 10, which receives therethrough the opposite ends of the U-bolt 12 which passes around the pipe 5. Suitable nuts 13, engaging the opposite ends of the bolt 12, serve to rigidly secure the housing to the pipe 5.

The housing 8 contains a removable hollow compressible member or liner 14 made of rubber or similar resilient material which provides the regulatable passage for fluid through the valve. The liner fits closely to the similar shaped interior of the housing which sustains it against internal pressure. The liner is inserted into the housing through the inner enlarged end thereof, and the inner end of the liner is clamped between the housing 8 and the pipe 5, as indicated at 11.

That portion of the liner indicated at 11 which is clamped between the housing and pipe serves also as a packing to prevent leakage of the valve. Even though the outer surface of the pipe 5 be somewhat uneven or roughened, the liner can be readily compressed to provide a tight fit and prevent leakage. Also, it will be noted that the inner end of the hollow liner 14 has an inner diameter slightly greater than that of the outlet 6 which permits a free flow through the valve and creates a flushing action to prevent clogging of the valve.

The housing 8 is further provided with a lateral opening 15, and surrounding this opening is a boss 16 through which is threaded the screw plunger 17, carrying at its inner end a valve head 18 which acts to compress the liner upon the rotation of the plunger. The valve head 18 is detachably secured to the plunger 17 by means of pins 19, and should it be desired to remove the head 18 or plunger 17, it is simply necessary to first remove the pins 19.

In Fig. 1 an enlargement 20 formed on the side of the housing serves as an abutment or valve seat upon which to compress the liner. In the form of the invention shown, in Fig. 2 the housing, instead of being formed with an abutment, is provided with a recess 21 within which the valve head is adapted to compress the liner 14.

It will be seen that the abrasive within the pipe 5 can readily flow therefrom through the opening 6 into and through the valve, and that this flow of abrasive through the valve can be readily controlled by simply rotating the plunger 17 to compress or release the liner 14. It will also be appreciated that there has been provided a novel and simplified valve having associated therewith means whereby the same may be readily secured to a pipe with the expenditure of a minimum amount of time and labor. The liner 14, which, as stated, is formed of rubber or other suitable material, will effectively withstand the wear of an abrasive passing therethrough.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The combination with a liquid supply pipe having a lateral outlet therein, of a valve for controlling and varying the flow of liquid from said pipe including a hollow compressible member surrounding said outlet, said member continuing beyond the valve to form a permanent part of a fluid delivery line, means for clamping said member onto the pipe, and means for compressing said compressible member.

2. The combination with a liquid supply pipe having a lateral outlet therein, of a valve for controlling and varying the flow of liquid from said pipe including a hollow compressible member, said member continuing beyond the valve to form a permanent part of a fluid delivery line, and means for clamping said member onto the pipe in surrounding relation with said outlet, the end of the member adjacent said outlet having an inner diameter somewhat larger than said outlet.

3. The combination with a liquid supply pipe having a lateral outlet therein, of a valve for controlling and varying the flow of liquid from said pipe including a housing having a central bore adapted to align with said outlet, a hollow compressible member arranged within the housing and conforming to the shape of said bore, said member continuing beyond the valve to form a permanent part of a fluid delivery line, the inner end of said member being substantially cone-shaped and having an inner diameter larger than said outlet, means carried by said housing and extending around said pipe for clamping the same together with the compressible member thereto, and means for compressing said compressible member.

4. A valve for use in an abrasive supply system for controlling and varying the flow of abrasive from a lateral outlet formed in the main supply pipe including a housing surrounding the outlet in said pipe, a hollow compressible member arranged within the housing, said member continuing beyond the valve to form a permanent part of a fluid delivery line, means carried by the housing for clamping the compressible member and housing to the pipe, said housing being provided with a lateral opening and a boss surrounding the same, a permanently located plunger threaded through the boss, and a valve head carried at the inner end of the plunger and operable through said opening to control and vary the compressing of said compressible member.

5. The combination with a liquid supply pipe having a lateral outlet therein, of a valve for controlling and varying the flow of liquid from said pipe including a housing, a hollow compressible member arranged within the housing and adapted to register with said outlet, said compressible member continuing beyond the housing to form a permanent part of a fluid delivery line, means for securing the housing to the pipe, and means permanently carried by the housing for compressing said compressible member.

Signed at Toledo, in the county of Lucas and State of Ohio, this 30th day of August. 1926.

JOHN C. GIPE.